(12) United States Patent
Saitoh et al.

(10) Patent No.: US 6,718,749 B2
(45) Date of Patent: Apr. 13, 2004

(54) COMBINED CYCLE POWER GENERATION PLANT OPERATING MORE STABLY ON LOAD CHANGE

(75) Inventors: Akihiko Saitoh, Hyogo-ken (JP);
Takashi Sonoda, Hyogo-ken (JP);
Shouichi Nagata, Hyogo-ken (JP);
Teruo Tateishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 81 days.

(21) Appl. No.: 10/062,454

(22) Filed: Feb. 5, 2002

(65) Prior Publication Data

US 2002/0108366 A1 Aug. 15, 2002

(30) Foreign Application Priority Data

Feb. 15, 2001 (JP) ........................ 2001-039187
Mar. 30, 2001 (JP) ........................ 2001-101867

(51) Int. Cl.[7] ............................................. F02C 9/26
(52) U.S. Cl. ........................................... 60/39.281
(58) Field of Search .................. 60/29.281; 290/40 R, 290/40 B (56) References Cited

U.S. PATENT DOCUMENTS

| | | | | |
|---|---|---|---|---|
| 4,146,270 A | * | 3/1979 | Nurnberger et al. | ...... 290/40 R |
| 4,238,924 A | * | 12/1980 | Kanegae | ...... 60/39.281 |
| 4,280,059 A | * | 7/1981 | Zickwolf, Jr. | ...... 290/40 B |
| 4,922,710 A | * | 5/1990 | Rowen et al. | ...... 60/39.281 |
| 5,953,902 A | * | 9/1999 | Jerye et al. | ...... 60/39.281 |

FOREIGN PATENT DOCUMENTS

JP 9-324656 12/1997

* cited by examiner

*Primary Examiner*—Michael Koczo
(74) *Attorney, Agent, or Firm*—Oblon, Spivak, McClelland, Maier & Neustadt, P.C.

(57) ABSTRACT

A combined cycle power generation plant includes a gas turbine operating in response to a turbine control signal and a speed control apparatus which outputs the turbine control signal to the gas turbine based on a speed governor control signal for a first time period after an operation of the plant is switched to a system isolated operation. The speed governor control signal is a signal for speed control of the gas turbine, and a switching signal is generated when the operation of the plant is switched to the system isolated operation.

20 Claims, 10 Drawing Sheets

COMBINED CYCLE POWER GENERATION PLANT OPERATING MORE STABLY ON LOAD CHANGE

BACKGROUND OF THE INVENTION

1. Field of the Invention

The present invention relates to a speed control apparatus of a combined cycle power generation plant.

2. Description of the Related Art

Figure 1:
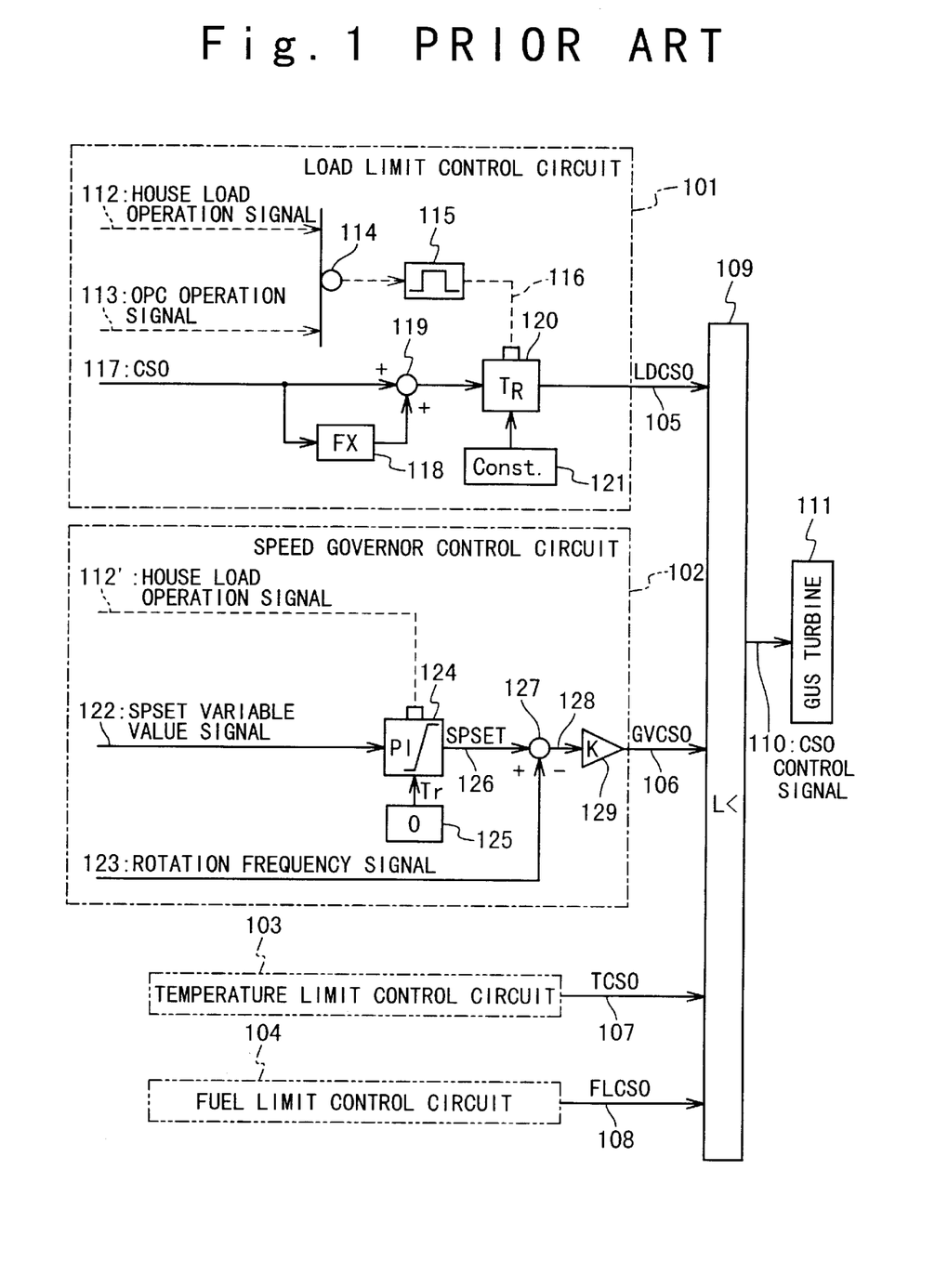
FIG. 1 is a circuit block diagram showing a conventional combined cycle power generation plant.

As a power generation system, a combined cycle power generation plant is known. The control of the combined cycle power generation plant is achieved by a gas turbine control system. A control logic circuit is incorporated in the gas turbine control system to output a gas turbine load instruction. Such a control logic circuit is shown in FIG. 1. Referring to FIG. 1, the control logic is composed of a load limit control circuit 101, a speed governor control circuit 102, a temperature limit control circuit 103 and a fuel limit control circuit 104. The load limit control circuit 101 outputs a load limit control signal (LDCSO) 105. The speed governor control circuit 102 outputs a speed governor control signal (GVCSO) 106. The temperature limit control circuit 103 outputs a temperature limit control signal (TCSO) 107. The fuel limit control circuit 104 outputs a fuel limit control signal (FLCSO) 108. Of the signal lines in the figure, the broken line shows a digital signal and the solid line shows an analog signal.

A minimum level selector 109 is supplied with the load limit control signal 105, the speed governor control signal 106, the temperature limit control signal 107, and the fuel limit control signal 108. The minimum level selector 109 selects a signal with a minimum level L< from among the above-mentioned four control signals 105, 106, 107 and 108 and outputs it as a final fuel control output signal (CSO control signal) 110. The final fuel control output signal 110 is a control signal to control a fuel quantity supplied to the gas turbine 111.

A house load operation signal 112 and an over-speed protection control (OPC) operation signal 113 which is sent from an over-speed protection control circuit are supplied to the load limit control circuit 101. The house load operation signal 112 and the over-speed protection control signal 113 are supplied to a logical summation (OR) unit 114. A one-shot timer 115 outputs a signal 116 for a predetermined time period in response to the signal outputted from the logical summation unit 114. The control output signal (CSO) 117 is further supplied to the load limit control circuit 101. The control output signal 117 is supplied to a function value unit 118 and an adder 119. The function value unit 118 converts the control output signal 117 into a value signal. The adder 119 adds the control output signal 117 and the value signal from the function value unit 118. A signal obtained by the addition in the adder 119 is supplied to a rate-added switching unit 120 in which a rate is switched at the same time as a switching operation, in addition to a constant time signal 116. The switching unit 120 outputs not an addition value obtained by the addition in the adder 119 but a signal with a value set by a constant value unit 121 as the load limit control signal 105 in response to the signal 116 for the predetermined time period.

The house load operation signal 112', a variable value signal (SPSET) 122 which indicates the difference of a load set value and an actual load value, and an axis rotation frequency signal 123 are supplied to the speed governor control circuit 102. The house load operation signal 112' and the variable value signal 122 are supplied to a proportional integrator 124. The proportional integrator 124 integrates the variable value signal 122 proportionally to produce an integration value output signal 126. Also, the proportional integrator 124 outputs a constant value signal of 0 which is set to a constant value unit 125 in response to the house load operation signal 112'. A subtractor 127 subtracts the axis rotation frequency signal 123 from the integration value output signal 126 to produce a subtraction Resultant signal 128. The subtraction resultant signal 128 is amplified by an amplifier 129 and is outputted as the above-mentioned speed governor control signal 106.

Figure 2:
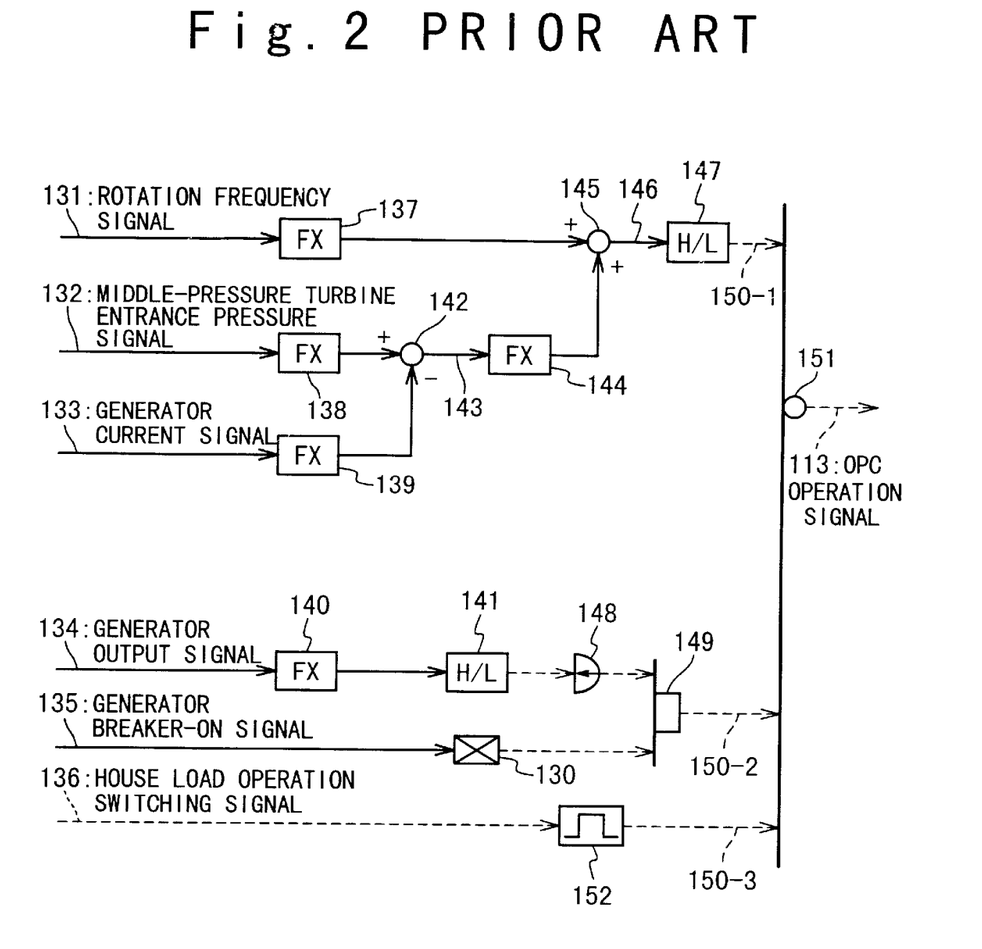
FIG. 2 is a circuit block diagram showing a conventional over-speed protection control (OPC) operation apparatus.

FIG. 2 shows the control logic of the over-speed protection control (OPC) circuit. The rotation frequency signal 131 of the gas turbine 111, an entrance pressure signal 132 in a middle-pressure turbine of the gas turbine 111, a generator current signal 133, and a generator output signal 134 are supplied to function value units 137, 138, 139, and 140 to convert the physical quantities of them into percentage values, respectively. A generator breaker-on signal 135 is supplied to an inverter (NOT) unit 130. A house load operation switching signal 136 is supplied to a one-shot timer 152. The middle-pressure turbine entrance pressure signal 132 and the generator current signal 133 are supplied to a subtractor 142 through the function value units 138 and 139. The subtraction value obtained by the subtractor 142 or, a load difference signal 143 is supplied to an adder 145 through the other function value unit 144. The rotation frequency signal 131 is supplied to the adder 145 through the function value unit 137. The addition value 146 obtained by the adder 145 is supplied to a monitor unit 147 which sends a digital signal based on an optional setting range. The generator output signal 134 is supplied to a logical product (AND) unit 149 through a function value unit 140, a monitor 141, and an off-delay timer 148. The generator breaker-on signal 135 is supplied to the logical product unit 149 through the inverter unit 130. A monitor signal 150-1 outputted from the monitor unit 147, a signal 150-2 outputted from the logical product unit 149 and a signal 150-3 outputted from the one-shot timer 152 are supplied to a logical summation (OR) unit 151. The output signal outputted from the logical summation unit 151 is the above-mentioned over-speed protection control signal (OPC signal) 113 shown in FIG. 1 for the OPC operation.

The over-speed protection control (OPC) circuit has the control logic shown in FIG. 2, and is a protection unit of the gas turbine 111 from over-speed trip which occurs when the turbine 111 is accelerated rapidly in case of rapid load decrease due to load blocking-off and so on. The over-speed protection control (OPC) circuit monitors the speed increase rate as the output signal of the function value unit 137 and the load difference as subtraction value 143. When the value obtained by adding a bias (preceding) signal based on the load difference to the turbine rotation speed increase rate is larger than a threshold value set in the monitor unit 147, the over-speed control (OPC) operation is carried out to close a turbine governor rapidly.

In the above conventional apparatus, there is a case that the OPC operation is not carried out because the switching to a system isolated operation is carried out but a system load loss is small. In such a case, the final fuel control output signal (CSO control signal) 110 is limited based on the load limit control signal 105 which follows a change rate which is determined from the viewpoint of the gas turbine protection or the control signals such as the temperature limit control (TCSO) signal 107. Also, the time period appears during which the axis rotation frequency control cannot be carried out based on the speed governor control (GVCSO) signal 106. At that time, the phenomenon occurs where the rotation frequency decreases largely from a rating range of the rotation frequency, and the trip is caused. Also, when the variable value signal 122 is determined from the difference of a load set value and an actual load value after the switching to the system isolated operation, the variable value signal 122 and the integration value signal 126 change based on an erroneous load set value regardless that the load is not clear. Therefore, there is fear that the integration value signal 126 cannot keep a constant value and influences as an external disturbance. For this reason, the rotation frequency control based on the speed governor control signal 106 as the speed governor control circuit output becomes difficult. Moreover, even when the operation is switched to the system isolated operation and the OPC operation is carried out because the system load loss is large, the rotation frequency increases for this time period and the rotation axis inertia becomes large. In this case, the trip is caused in the process of decreasing the rotation frequency, if there is a large time difference between the switching to the system isolated operation and the OPC operation.

Therefore, it is demanded that an improper control by which the trip phenomenon is caused can be avoided, and a proper control can be carried out on the switching to the system isolated operation.

In conjunction with the above description, an operation control apparatus is disclosed in Japanese Laid Open Patent Application (JP-A-Heisei 9-324656). In this reference, a minimum level selector 16a selects a minimum one of the output signal of a fuel limit control unit 11, the output signal of a load limit control unit 12, and an output signal of a speed control 13 and outputs the selected signal to a minimum level selector 16b and an air control valve 4. The output signal of a blade path temperature limit control unit 14 and the output signal of an exhaust gas temperature limit control unit 15 are supplied to the minimum Level selector 16b. The minimum level selector 16b selects a minimum one of the output signal of a blade path temperature limit control unit 14, the output signal of an exhaust gas temperature limit control unit 15, and the output signal of the minimum level selector 16a and outputs the selected signal to a fuel control valve 3.

SUMMARY OF THE INVENTION

Therefore, an object of the present invention is to provide a combined cycle power generation plant in which a proper speed control is carried out to prevent a trip.

Another object of the present invention is to provide a combined cycle power generation plant in which proper speed control is carried out on the switching to a system isolated operation.

In an aspect of the present invention, a combined cycle power generation plant includes a gas turbine operating in response to a turbine control signal, and a speed control apparatus which outputs the turbine control signal to the gas turbine based on a speed governor control signal for a first time period after an operation of the plant is switched to a system isolated operation. The speed governor control signal is a signal for speed control of the gas turbine, and a switching signal is generated when the operation of the plant is switched to the system isolated operation.

The speed control apparatus may include a speed governor control circuit, a plurality of limit control circuits and a minimum signal selector. The speed governor control circuit generates the speed governor control signal. The plurality of limit control circuits generate control signals for limit controls to the gas turbine, respectively. The minimum signal selector selects the speed governor control signal from among the speed governor control signal and the control signals for the first time period as a signal with the lowest level.

In this case, it is desirable that at least one of the plurality of limit control circuits outputs the control signal in response to the switching signal to have a predetermined level higher than the lowest level for a second predetermined time period including the first time period.

In this case, the limit control circuit includes a load limit control circuit for maximum output limit control of the gas turbine. The load limit control circuit may include a one-shot timer, a constant value generating unit and a switching unit. The one-shot timer generates a first timer signal for the second predetermined time period in response to the switching signal. The constant value generating unit generates a first constant value signal. The switching unit outputs the first constant value signal in response to the first timer signal as the control signal.

The limit control circuit may include a temperature limit control circuit for maximum temperature limit control of the gas turbine. In this case, the temperature limit control circuit may include a one-shot timer, a constant value generating unit and a switching unit. The one-shot timer generate a second timer signal for the second predetermined time period in response to the switching signal. The constant value generating unit generates a second constant value signal. The switching unit outputs the second constant value signal in response to the second timer signal as the control signal.

Also, the limit control circuit may include a fuel limit control circuit for maximum fuel limit control of the gas turbine. In this case, the temperature limit control circuit may include a one-shot timer, a third constant value generating unit and a switching unit. The one-shot timer generate a third timer signal for the second predetermined time period in response to the switching signal. The third constant value generating unit generates a third constant value signal. The switching unit outputs the third constant value signal in response to the third timer signal as the control signal.

Also, the speed governor control circuit may include a proportional integrator, a subtractor and an amplifier. The proportional integrator proportionally integrates a variable value signal to produce an integration value signal, and the variable value signal indicates a difference between a target load value and an actual load value. The subtractor subtracts an actual rotation frequency indicating the actual rotation frequency of the gas turbine from the integration value signal to produce a subtraction resultant signal. The amplifier amplifies the subtraction resultant signal and outputs the amplified signal as the speed governor control signal.

Also, the speed governor control signal is the signal for the speed control of the gas turbine in a rating speed range, and the speed governor control signal is lowered in level in response to the switching signal. In this case, the speed governor control circuit may include a switching unit, a proportional integrator, a subtractor and an amplifier. The switching unit outputs a variable value signal as a selected signal usually and outputs a predetermined level signal as the selected signal in response to the switching signal, the variable value signal indicating a difference between a target load value and an actual load value. The proportional integrator proportionally integrates the selected signal to produce an integration value signal. The subtractor subtracts an actual rotation frequency indicating the actual rotation frequency of the gas turbine from the integration value signal to produce a subtraction resultant signal. The amplifier amplifies the subtraction resultant signal and outputs the amplified signal as the speed governor control signal.

Also, the speed control apparatus may further include an over-speed control circuit which generates an over-speed control operation signal when a difference between a value signal corresponding to an entrance pressure signal of a middle-pressure turbine of the gas turbine and a value signal corresponding to a generator current is equal to or larger than a predetermined threshold, and when the operation of the plant is not switched to a house load operation. A load limit control circuit may include a one-shot timer, a constant value generating unit and a switching unit. The one-shot timer generate a fourth timer signal for a second predetermined time period in response to the over-speed control operation signal, the second predetermined time period including the first time period. The constant value generating unit generates a fourth constant value signal. The switching unit outputs the fourth constant value signal in response to the fourth timer signal as the control signal.

In another aspect of the present invention, a combined cycle power generation plant includes a gas turbine, a load limit control circuit, a speed governor control circuit and a minimum level selector. The load limit control circuit outputs a load limit control signal to control speed of the gas turbine. The speed governor control circuit outputs a speed governor control signal to control the speed of the gas turbine. The minimum level selector selects the speed governor control signal from among the load limit control signal and the speed governor control signal for a time period after switching to a system isolated operation of the plant. The peed governor control signal is lower than the load limit control signal in level, and a system isolated operation signal is generated when an operation of the plant is switched to the system isolated operation.

In this case, the load limit control circuit may include a first switching unit which outputs the load limit control signal with a level higher than the speed governor control signal in response to the system isolated operation signal.

Also, the speed governor control signal may be a signal with a level corresponding to a subtraction value obtained by subtracting a rotation frequency of the gas turbine from an integration value of a variable value signal with respect to a reference level, and the variable value signal indicates a difference between a load set value and an actual load value. The speed governor control circuit may include a second switching unit which outputs a value with a level lower than the variable value signal in response to the system isolated operation signal in place of the variable value signal.

Also, the load limit control circuit may include a first switching unit which outputs the load limit control signal with a level higher than the speed governor control signal in response to the system isolated operation signal. The speed governor control signal may be a signal with a level corresponding to a subtraction value obtained by subtracting a rotation frequency of the gas turbine from an integration value of a variable value signal with respect to a reference level, and the variable value signal indicates a difference between a load set value and an actual load value. The speed governor control circuit may include a second switching unit which outputs a value with a level lower than the variable value signal in response to the system isolated operation signal in place of the variable value signal.

Also, the combined cycle power generation plant may further include a temperature limit control circuit may include a third switching unit which outputs a temperature limit control signal with a level higher than the speed governor control signal in response to the system isolated operation signal for the predetermined time period.

Also, the combined cycle power generation plant may further include a fuel limit control circuit may include a fourth switching unit which outputs a fuel limit control signal with a level higher than the speed governor control signal in response to the system isolated operation signal for the predetermined time period.

In addition, the combined cycle power generation plant may further include an over-speed control logic circuit which outputs a load loss signal as a logical product of a load difference signal and a logical inversion of the system isolated operation signal.

BRIEF DESCRIPTION OF THE INVENTION

DESCRIPTION OF THE PREFERRED EMBODIMENTS

A combined cycle power generation plant of the present invention will be described below in detail with reference to the attached drawings.

Figure 3:
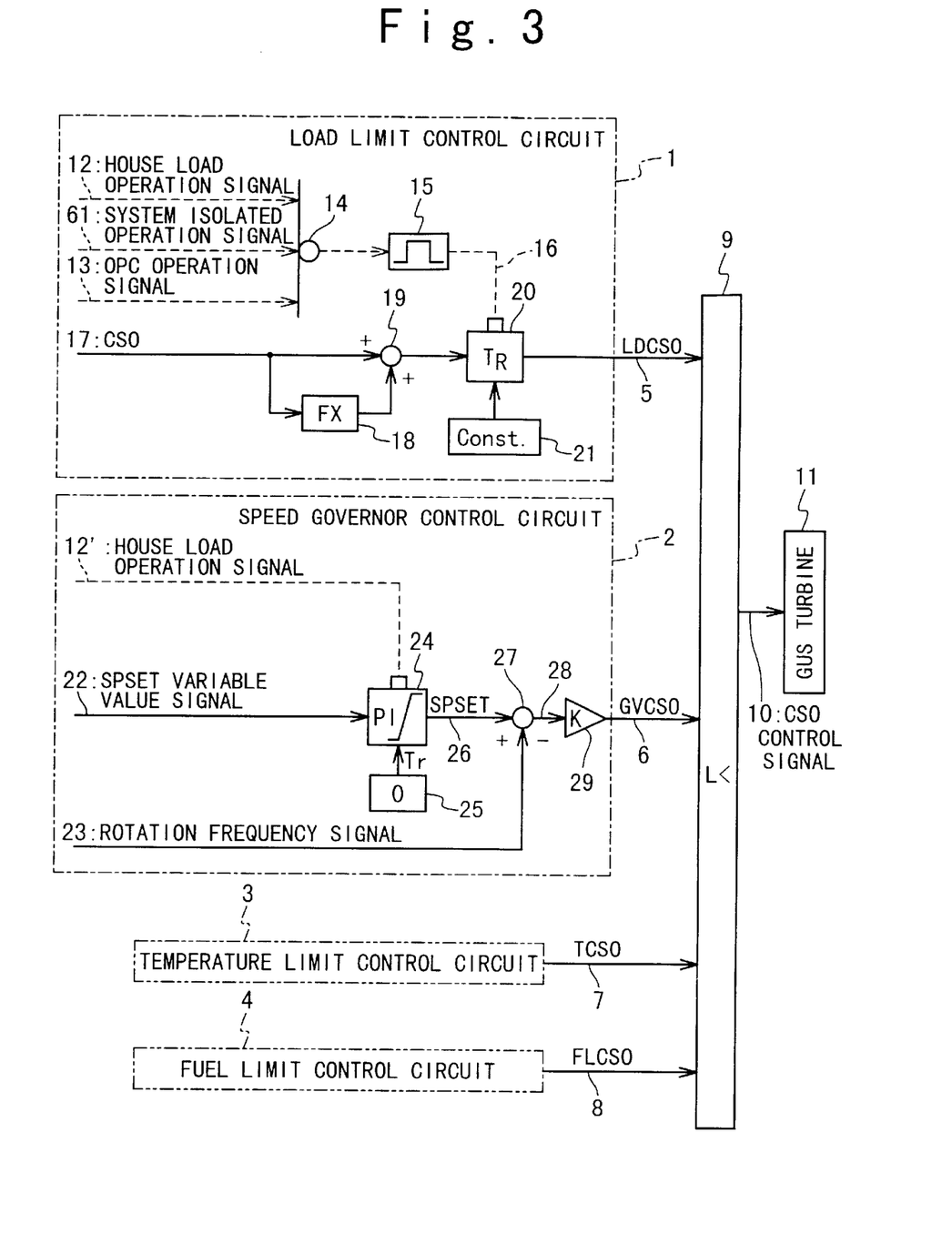
FIG. 3 is a circuit block diagram showing a combined cycle power generation plant according to a first embodiment of the present invention.

FIG. 3 shows the combined cycle power generation plant according to the first embodiment of the present invention. Referring to FIG. 3, the combined cycle power generation plant in the first embodiment is composed of a speed control apparatus and a gas turbine 11. The speed control apparatus outputs a CSO control signal as a fuel supply control signal to the gas turbine 11. The gas turbine 11 has a fuel supply control valve (not shown) which is controlled based on the CSO control signal.

The speed control apparatus is comprised of a load limit control circuit 1, a speed governor control circuit 2, a temperature limit control circuit 3, a fuel limit control circuit 4 and a minimum level selector (minimum level selector) 9. The load limit control circuit 1 generates a load limit control signal (LDCSO) 5 for maximum output limit control to the gas turbine 11. The speed governor control circuit 2 generates a speed governor control signal (GVCSO) 6 for speed control of the gas turbine 11. The temperature limit control circuit 3 generates a temperature limit control signal (TCSO) 7 for maximum temperature limit control to the gas turbine 11. The fuel limit control circuit 4 generates a fuel limit control signal (FLCSO) 8 for fuel limit control to the gas turbine 11. Of the signal lines shown in the figure, the broken line shows a digital signal line and the solid line shows an analog signal line.

The load limit control circuit 1 is comprised of a logical-summation (OR) unit 14, a one-shot timer 15, a function value unit 18, adder 19, a constant value unit 21, and a switching unit 20. A house load operation signal 12, a system isolated operation signal 61 and an over-speed protection control (OPC) operation signal 13 are supplied to the logical summation unit 14. The house load operation signal 12 is generated when the operation of the plant is switched to a house load operation. The system isolated operation signal 61 is generated when the operation of the plant is switched to a system isolated operation. An over-speed protection control (OPC) operation signal 13 is supplied from an over-speed protection controller (OPC). A one-shot timer 15 outputs a time period signal 16 active for a predetermined time period in response to on a signal outputted from the logical summation unit 14.

In addition, a control output signal (CSO signal) 17 is supplied to the function value unit 18 and the adder 19. The adder adds the CSO signal 17 and a value signal obtained from the function value unit 18 and supplies the addition resultant signal to the switching unit 20. The constant value unit 21 outputs a constant value signal. The switching unit 20 usually outputs the addition resultant signal. However, the switching unit 20 selects and outputs the constant value signal from the constant value unit 21 in response to the time period signal 16. The output signal from the switching unit 20 is supplied to the minimum level selector 9 as a load limit control (LDCSO) signal.

The speed governor control circuit 2 is comprised of a proportional integrator 24, a constant value unit 25, a subtractor 27 and an amplifier 29. A SPSET variable value signal 22 and a constant value signal (0 value signal in this example) are supplied to the proportional integrator 24. The variable value signal 22 is determined from the difference of a load set value and an actual load value. The proportional integrator 24 proportionally integrates the variable value signal 22 usually to produce an integration value signal 26. However, the proportional integrator 24 does not proportionally integrates the variable value signal but outputs the constant value of 0 from the constant value unit 25 as the integration value signal 26 in response to the house load operation signal 12'. The proportional integrator 24 outputs the integration value signal to the subtractor 27. A rotation frequency signal 23 indicating the rotation frequency of the gas turbine 11 is also supplied to the subtractor 27. The subtractor 27 subtracts the rotation frequency signal 23 from the integration value signal 26 to produce a subtraction resultant signal 28 which is supplied to the amplifier 29. The amplifier 29 amplifies the subtraction resultant signal 28 and output the amplified signal as a speed governor control signal 6 to the minimum level selector 9.

The temperature limit control circuit 3 and the fuel limit control circuit 4 output the temperature limit control signal (TCSO) 7 and the fuel limit control signal (FLCSO) 8 to the minimum level selector 9.

The minimum level selector 9 selects a signal with the minimum level L< from among the above-mentioned four control signals 5, 6, 7 and 8, and outputs it as the final fuel control output signal (CSO control signal) 10. The final fuel control output signal 10 is a control signal to control the supply of fuel to the gas turbine 11.

As described above, on a usual load operation, the load limit control signal 5 follows the value obtained by adding a bias value determined by the function value unit 18 to the control signal 17 by the adder 19 through the switching unit 20. On the house load operation, the load limit control signal 5 is changed to a tracking value set by the constant value unit 21 by the switching unit 20 for a predetermined time period which is set by the one-shot timer 15 in response to the house load operation signal 12. The same operation is carried out in response to the over-speed protection control signal 13 or the system isolated operation signal 61.

Figure 4:
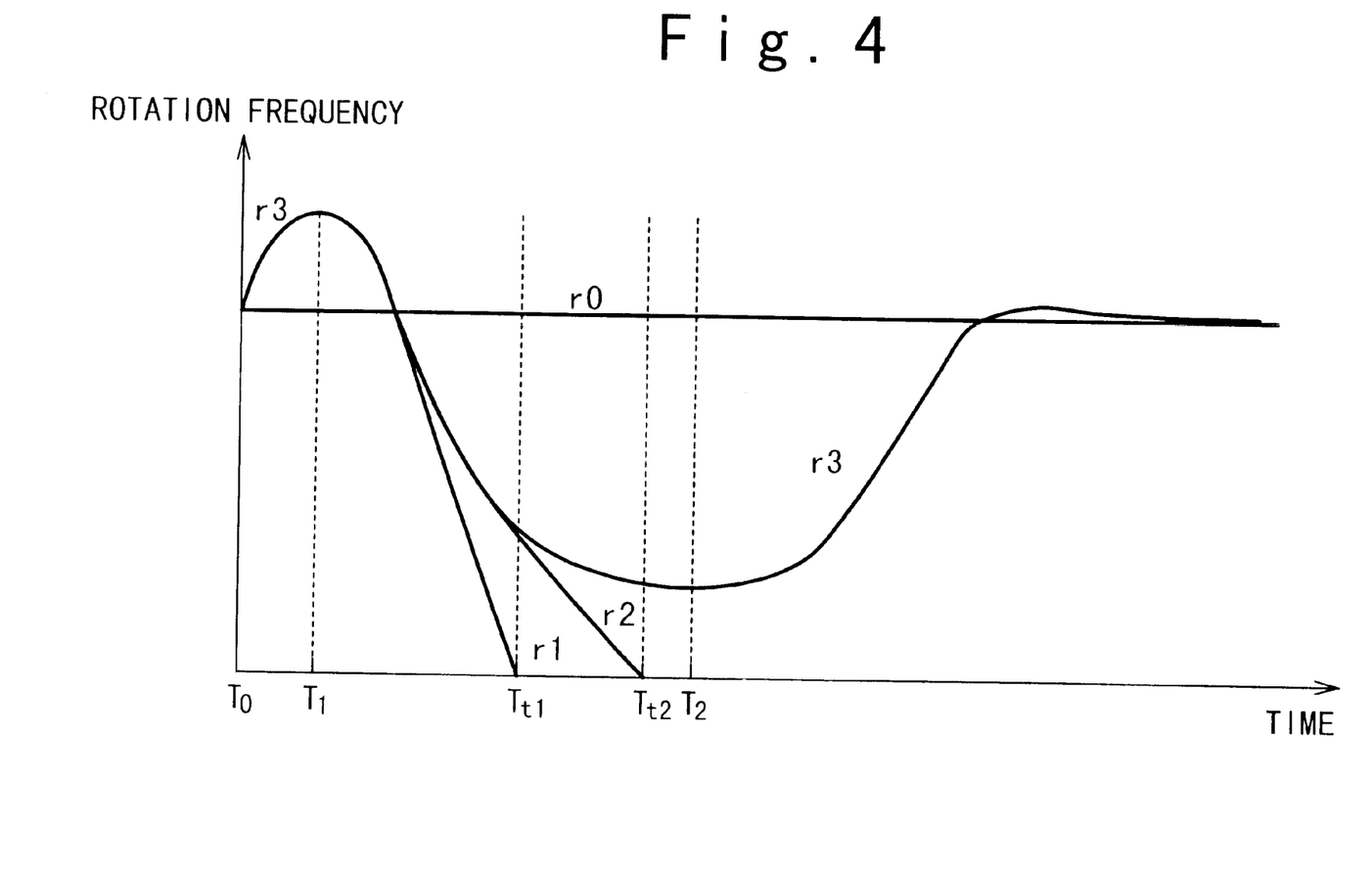
FIG. 4 is a graph showing a relation of time and rotation frequency of a gas turbine.

FIG. 4 shows a relation of rotation frequency and time on the system isolated operation when the over-speed protection control operation is not carried out. The system load decreases rapidly when the operation of the plant is switched to the system isolated operation at time T0. For this reason, the rotation frequency increases rapidly from an initial rating rotation frequency r0 and the rotation frequency reaches a maximum value at time T1. To decrease the rotation frequency, the subtraction resultant signal 28 outputted from the subtractor 27 decreases rapidly. Also, the speed governor control signal 6 decreases rapidly, so that the final fuel control signal (CSO) 10 decreases, although the load limit control signal 5 decreases based on the control output signal 17. Then, as the subtraction resultant signal 28 increases when the speed governor control signal 6 is too reduced after time T1, the rotation frequency increases again. As a result, the speed governor signal 28 increases again.

Figure 5:
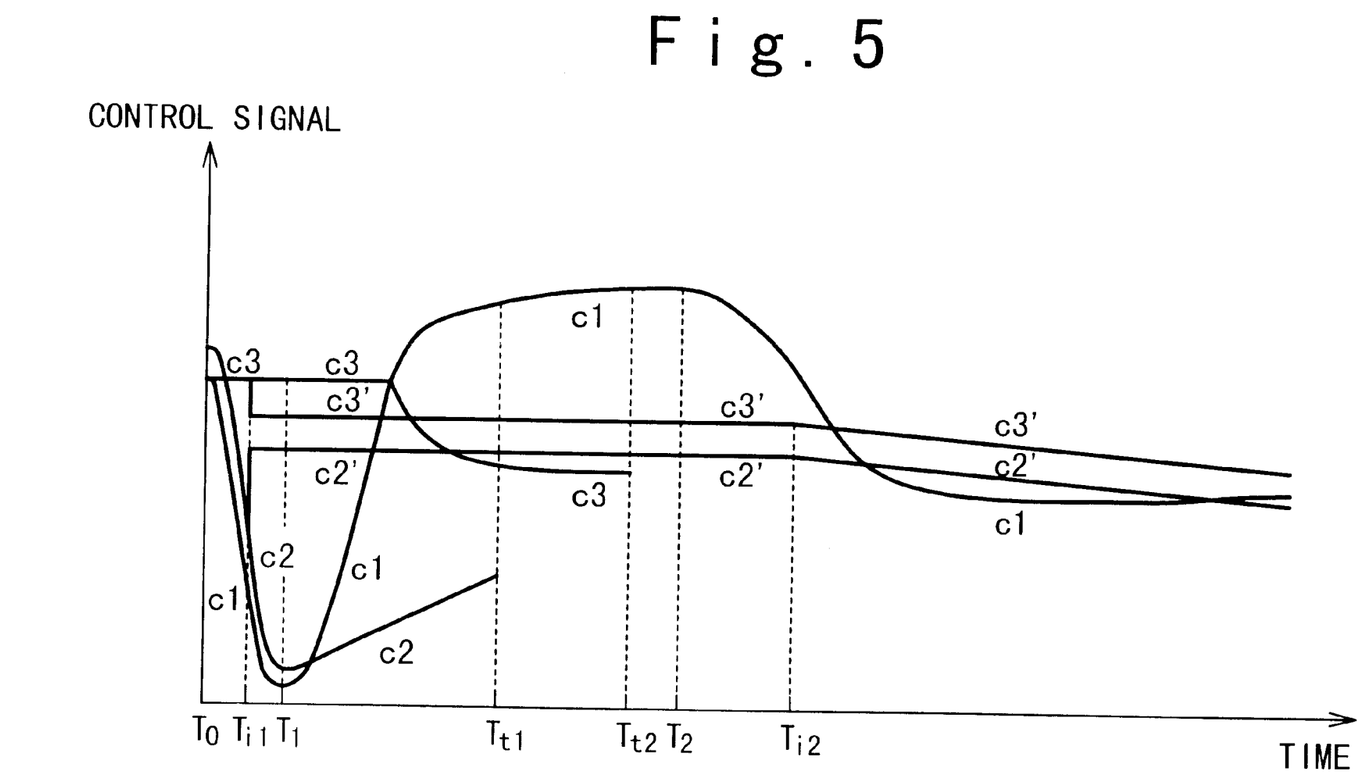
FIG. 5 is a graph showing a relation of time and control signals.

As shown in FIG. 5, the speed governor control signal 6 (C1) which has decreased rapidly since time T1 when the rotation frequency reaches a maximum value, and then increases again. In this case, in the conventional apparatus, the load limit control signal 5 (C2) increases in accordance with a rate set in the viewpoint of apparatus protection. Therefore, a time period appears during which the load limit control signal (C2) is higher than the speed governor control signal (C1) in level. In this case, the minimum level selector 9 selects the load limit control signal 5 (c2) as the final fuel control signal 10. For this time period, the control of the rotation frequency becomes impossible because the speed governor control signal 6 (c1) is not selected as the final fuel control signal 10. In this case, as shown in FIG. 4, the rotation frequency continues to decrease as shown by r1, and reaches a trip state at time Tt1 at last.

In the combined cycle power generation plant according to the present invention, the load limit control signal 5 (c2') is set to a constant level larger sufficiently than the speed governor control signal 6 (c1) by the constant value unit 21 in response to the system isolated operation signal 61 sent to the time Ti1. The higher constant level C2' is tracked and kept for the time period of Ti1 to Ti2 set by the one-shot timer 15. Therefore, the final fuel control signal 10 is determined based on the speed governor control signal 6 (c1) through such a tracking operation irrespective of the control output signal 17. Thus, the control of the rotation frequency based on the speed governor control signal 6 becomes possible. Even when the over-speed protection control operation is not carried out in case of the switching to the system isolated operation, the load limit control signal 5 is tracked to a constant level lower than the control signal 17 for a predetermined time period. In this way, the speed governor control based on the speed governor control signal 6 is made possible. Also, as shown in FIG. 4 by the rotation frequency r3, the trip state can be avoided.

Figure 6:
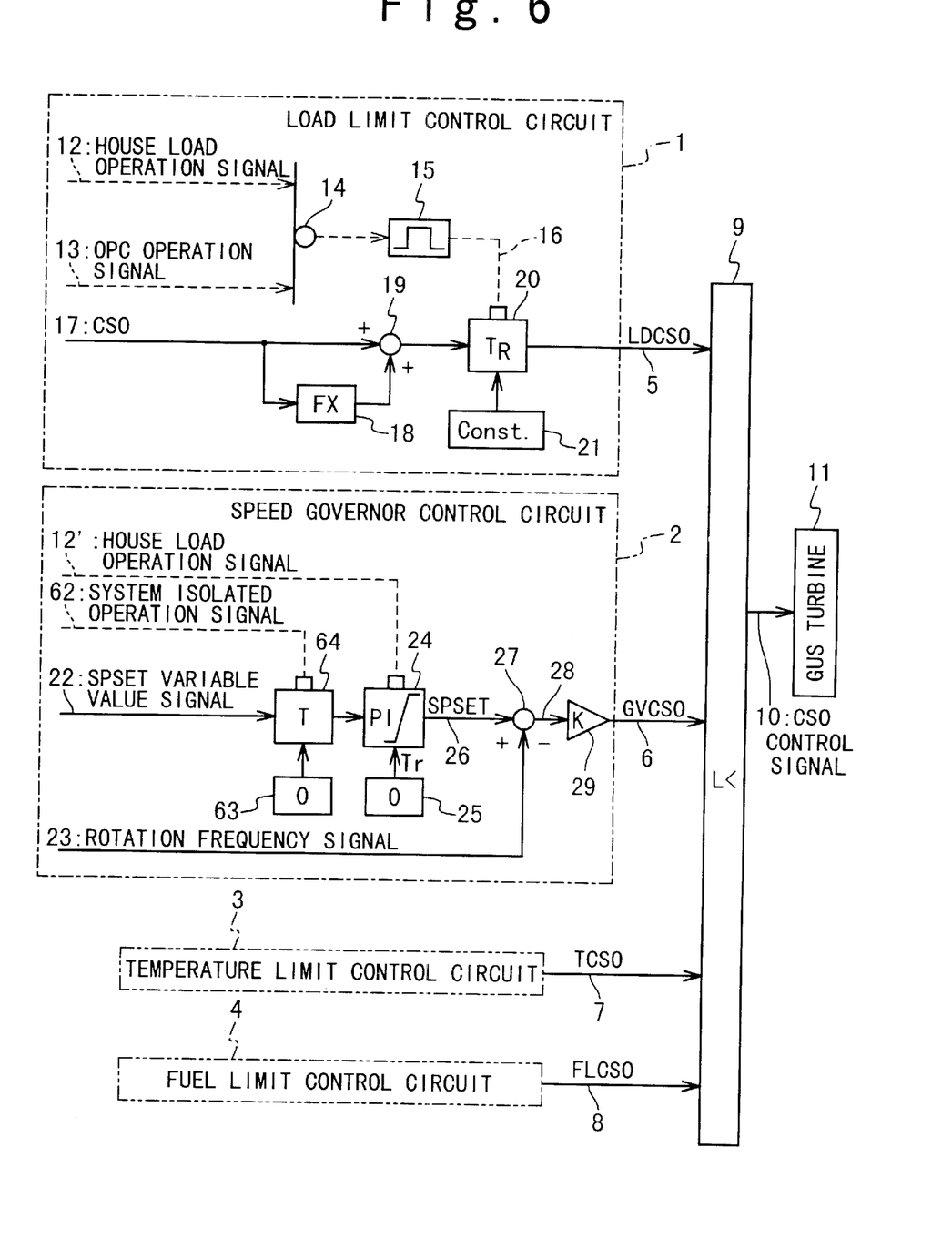
FIG. 6 is a circuit block diagram showing the combined cycle power generation plant according to a second embodiment of the present invention.

FIG. 6 shows the combined cycle power generation plant according to the second embodiment of the present invention. The speed control apparatus in the second embodiment is different from the speed control apparatus in the first embodiment in the load limit control apparatus in the first embodiment in the load limit control circuit 1 and the speed governor control circuit 2. The load limit control circuit 1 in this embodiment is the same as the conventional load limit control circuit 101 shown in FIG. 1 and is not supplied with the system isolated operation signal 61. In the speed governor control circuit 2 in this embodiment, a system isolated operation signal 62 is embodiment, a system isolated operation signal 62 is supplied to the speed governor control circuit 2. The speed governor control circuit 2 is comprised of a switching unit 64, a constant value unit 63, the proportional integrator 24, the constant value unit 25, the subtractor 27 and the amplifier 29.

On the usual load operation, the switching unit 64 selects the variable value signals 22 and supplies it to the proportional integrator 24. The proportional integrator 24 proportionally integrates the variable value signal 22 to produce the integration value signal 26. The speed governor control signal 6 is generated based on the integration value signal 26 and the rotation frequency signal 23.

On the house load operation, the proportional integrator 24 outputs not a value signal obtained through the proportional integration of the variable value signal but the constant value of 0 set by the constant value unit 25 in response to the house load operation signal 12' as the integration value signal 26. Thus, the integration value signal 26 is kept to a constant value. The speed governor control circuit 2 outputs the speed governor control signal 6 based on a difference between the integration value signal 26 and the rotation frequency signal 23.

On the system isolated operation, the switching unit 64 selects not the variable value signal 22 but the constant value signal of 0 set by the constant value unit 63 in response to the system isolated operation signal 62 and supplies it to the proportional integrator 24. Thus, the proportional integrator 24 outputs a predetermined constant value signal as the integration value signal 26. In this way, even when the house load operation signal is not supplied, the integration value signal 26 is kept to the constant value. Also, the speed governor control circuit 2 outputs the speed governor control signal 6 determined based on the difference between the integration value signal 26 and the rotation frequency signal 23 from the amplifier 29.

In the conventional apparatus, when the operation is switched to the system isolated operation, the integration value signal 26 before the switching to the system isolated operation is kept even after the switching to the system isolated operation. Therefore, there is fear that the integration value signal 26 cannot keep a constant value and influence as external disturbance. Also, the rotation frequency control based on the speed governor control signal 6 as the output of the speed governor control circuit 2 becomes difficult. However, because the variable value signal 22 is replaced by the value signal of 0 in response to the system isolated operation signal, there is no problem even if the integration value signal 26 is kept to a value before the switching to the system isolated operation. Thus, the speed governor control signal 6 is subjected to the proportional control based on the rotation frequency signal 23 and the subtraction resultant signal 28. In this way, the rotation frequency can be more effectively controlled in such a manner that the speed governor control is more stable and more effective.

Figure 7:
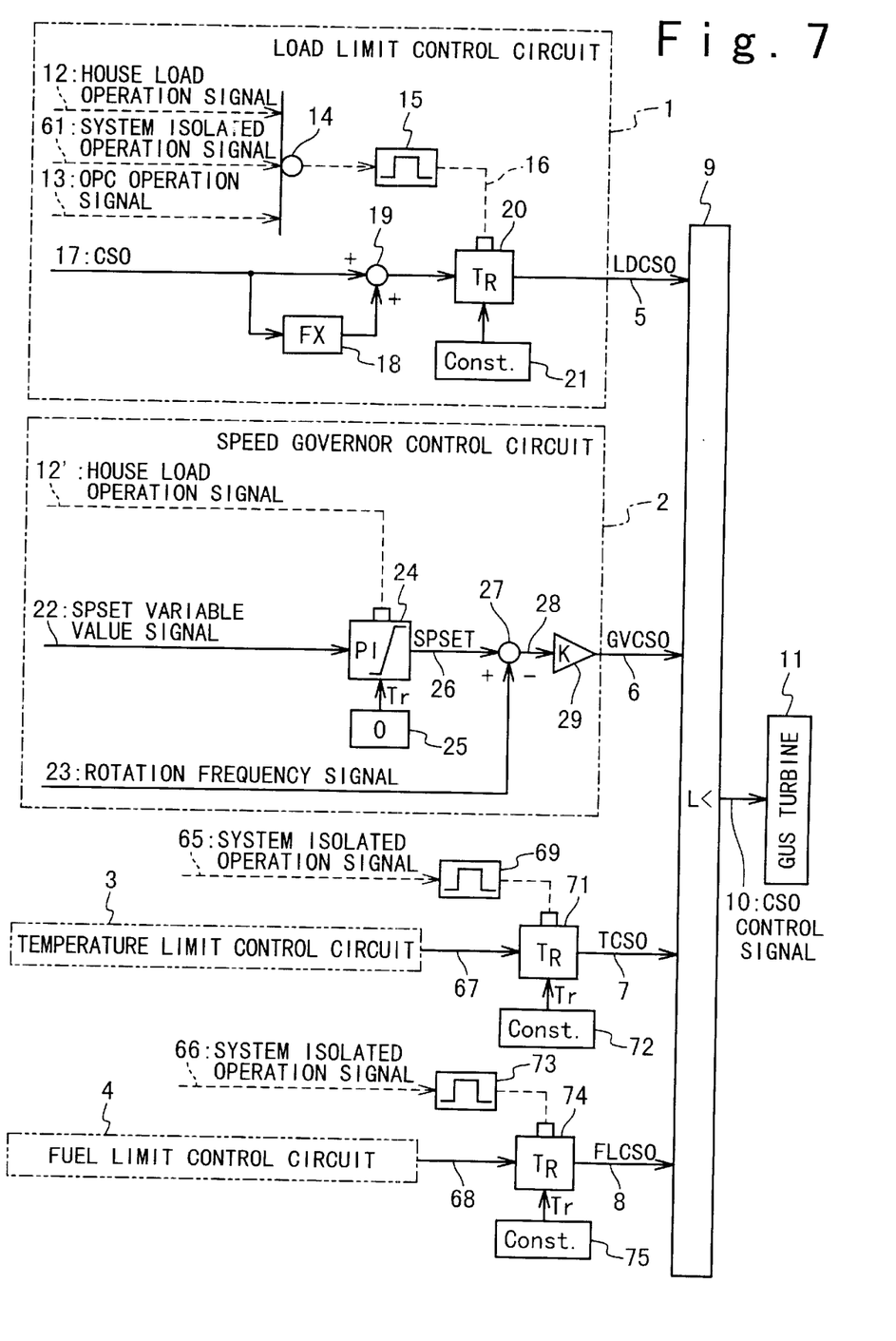
FIG. 7 is a circuit block diagram showing the combined cycle power generation plant according to a third embodiment of the present invention.

FIG. 7 shows the combined cycle power generation plant according to the third embodiment of the present invention. This embodiment is different from the first embodiment in the temperature limit control circuit 3 and the fuel limit control circuit 4. The load limit control circuit 1 and the speed governor control circuit 2 are same between the first embodiment and the third embodiment. In the third embodiment, a system isolated operation signal 65 and a system isolated operation signal 66 are newly supplied to the temperature limit control circuit 3 and the fuel limit control circuit 4, respectively. The temperature limit control circuit 3 in the third embodiment is comprised of the temperature limit control circuit 103 of FIG. 1, a one-shot timer 69, a switching unit 71 and a constant value unit 72. The fuel limit control circuit 4 in the third embodiment is comprised of the fuel limit control circuit 104 of FIG. 1, a one-shot timer 73, a switching unit 74 and a constant value unit 75.

In the temperature limit control circuit 3 in the third embodiment, on the usual operation, the switching unit 71 outputs the control signal from the temperature limit control circuit 103 of FIG. 1 to the minimum level selector 9 as the temperature limit control signal. However, on the switching to the system isolated operation, the one-shot timer 69 generates a predetermined time period signal in response to the system isolated operation signal 65. The switching unit 71 selects a constant value signal outputted from the constant value unit 72 and outputs to the minimum level selector 9 as the temperature limit control signal.

In the fuel limit control circuit 4 in the third embodiment, on the usual operation, the switching unit 74 outputs the control signal from the fuel limit control circuit 104 of FIG. 1 to the minimum level selector 9 as the fuel limit control signal. However, on the switching to the system isolated operation, the one-shot timer 73 generates a predetermined time period signal in response to the system isolated operation signal 66. The switching unit 74 selects a constant value signal outputted from the constant value unit 75 and outputs to the minimum level selector 9 as the temperature limit control signal.

The relation of the rotation frequency and time in the system isolated operation when the over-speed protection control operation is not carried out is as shown in FIGS. 4 and 5. As shown in FIGS. 4 and 5, the speed governor control signal 6 (C1) rapidly decreasing after time T1 when the rotation frequency reaches a maximum value, and increase again through increment of the rotation frequency. However, in the conventional apparatus, the speed governor control signal 6 (C1) begins decrease because the temperature limit control signal 7 (C3) operates to the safety side to suppress the over-increase of the speed governor control signal 6 when the speed governor control signal 6 becomes higher than a value before the switching to the system isolated operation. As the result of the decrease, there is a time period during which the temperature limit control signal 7 (C3) is lower than the speed governor control signal 6 (C1), and the minimum level selector 9 selects the temperature limit control signal 7 as the final fuel control signal 10. For this time period, the speed governor control signal 6 is not the final fuel control signal 10. Therefore, the control of the rotation frequency becomes impossible and the rotation frequency continues decrease as shown by r2 in FIG. 4 and reaches the trip state at time Tt2.

In the speed control apparatus in the third embodiment, the temperature limit control signal 7 is tracked to a sufficiently large value than the speed governor control signal 6 for the time period of Ti1 to Ti2 in response to the system isolated operation signal 65 sent at the time Ti1. The final fuel control output signal 10 is determined based on the speed governor control signal 6 irrespective of the temperature limit control signal 7 (C3'). Therefore, the control of the rotation frequency becomes possible. As for the fuel limit control signal 8, the above description about the temperature limit control signal 7 can be applied, and the fuel limit control signal 8 is determined based on the speed governor control signal 6 irrespective of the fuel limit control signal 8 through the tracking of the switching unit 74. Therefore, the control of the rotation frequency becomes possible.

The speed governor control is made possible by tracking the load limit control signal (LDCSO) 5, the temperature limit control signal (TCSO) 7, and the fuel control output signal (FLCSO) 8 to a predetermined value for the predetermined time period, even when the over-speed protection operation is not carried out in case of the switching to the system isolated operation. Also, it is possible to avoid the trip in the conventional apparatus.

FIG. 6 shows the speed control apparatus of the combined cycle power generation plant according to fourth embodiment of the present invention. In the speed control apparatus of the fourth embodiment, the load limit control circuit 1 is the same as the load limit control circuit 1 in the first embodiment. The speed governor control circuit 2 in the fourth embodiment is the same as the speed governor control circuit 2 in the second embodiment. The temperature limit control circuit 3 and the fuel limit control circuit 4 in the fourth embodiment are the same as the temperature limit control circuit 3 and the fuel limit control circuit 4 in the first embodiment. Therefore, the detailed description of the circuit structure and operation will be omitted.

Figure 8:
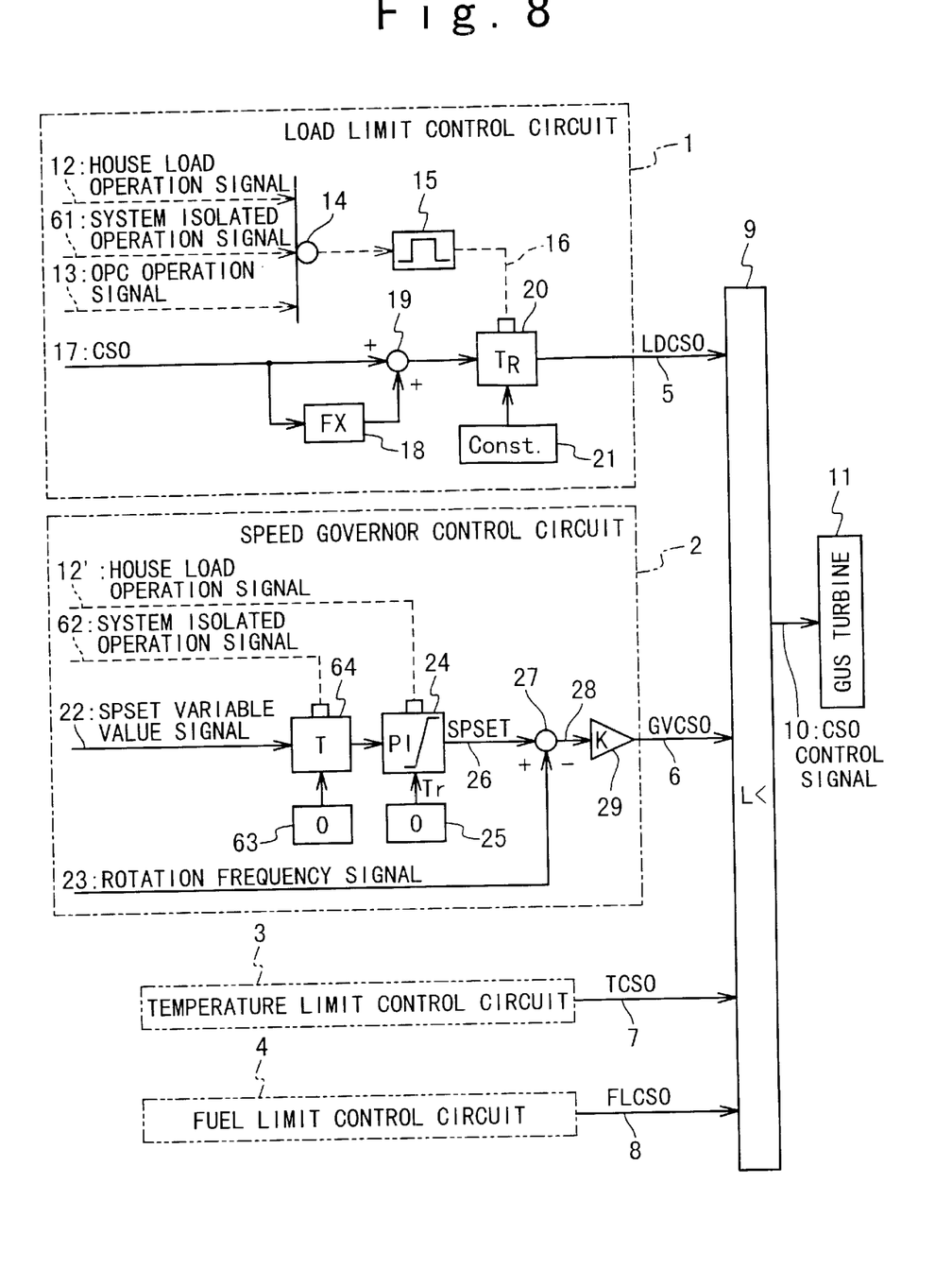
FIG. 8 is a circuit block diagram showing the combined cycle power generation plant according to a fourth embodiment of the present invention.

In the fourth embodiment which both of the system isolated operation signal 61 and the system isolated operation signal 62 are added, the occurrence of the trip can be more stably restrained, compared with the case that only the system isolated operation signal 61 is added or the case where only the system isolated operation signal 62 is added.

Figure 9:
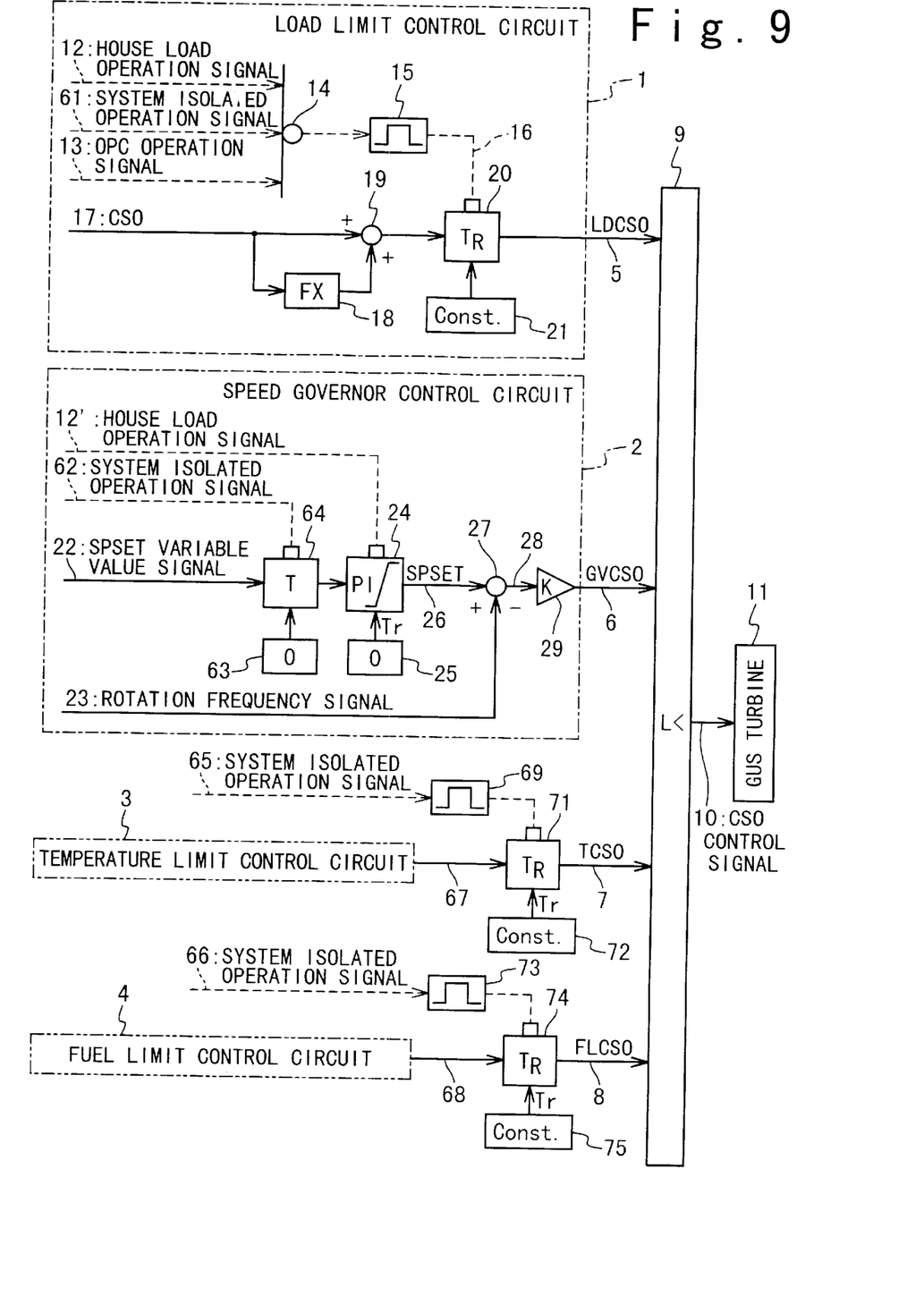
FIG. 9 is a circuit block diagram showing the combined cycle power generation plant according to a fifth embodiment of the present invention.

FIG. 9 shows the speed control apparatus of the combined cycle power generation plant according to the fifth embodiment of the present invention. In the speed control apparatus of the fifth embodiment, the load limit control circuit 1 is the same as the load limit control circuit 1 in the first embodiment. The speed governor control circuit 2 in the fifth embodiment is the same as the speed governor control circuit 2 in the second embodiment. The temperature limit control circuit 3 and the fuel limit control circuit 4 in the fifth embodiment are the same as the temperature limit control circuit 3 and the fuel limit control circuit 4 in the third embodiment. Therefore, the detailed description of the circuit structure and operation will be omitted.

In this embodiment, all the forms of the above-mentioned trip avoidances are adopted and the occurrence of the trip can be restrained more stably.

The speed governor control signal 6 is adopted as the final fuel control signal 10 through the tracking based on one or more signals selected from the load limit control signal 5, the speed governor control signal 6, the temperature limit control signal 7, and the fuel limit control signal 8. Thus, it is possible to control the rotation frequency of the gas turbine 11 properly in accordance with each of various types of gas turbines.

Figure 10:
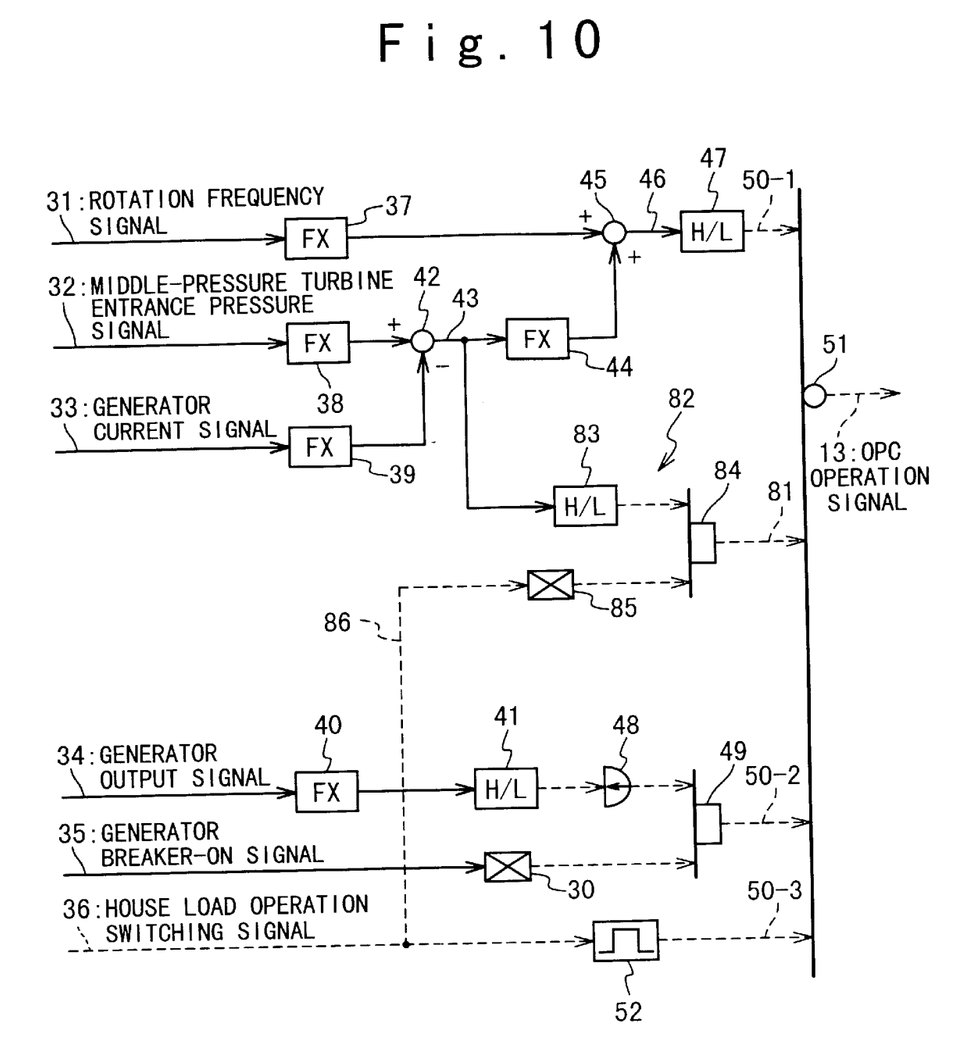
FIG. 10 is a circuit block diagram showing the combined cycle power generation plant according to a sixth embodiment of the present invention.

FIG. 10 shows the speed control apparatus of the combined cycle power generation plant according to sixth embodiment of the present invention. FIG. 10 shows the control logic of the over-speed protection control (OPC) circuit of the speed control apparatus. In this embodiment, an addition circuit section 82 is added to the conventional OPC circuit shown in FIG. 2. The over-speed protection control circuit is a prevention apparatus for the over-speed trip which has occurred due to rapid acceleration of the turbine 11 when the load decreases rapidly due to the load blocking-off and so on, as mentioned above. The over-speed of the rotation frequency of the turbine 11 is caused mainly based on a load unbalanced quantity which is determined from the difference between the turbine output and the generator output.

The over-speed protection control circuit is comprised of an additional circuit section 82 in addition to the circuit structure shown in FIG. 2. The additional circuit section 82 is comprised of a monitor unit 83, a logical product (AND) unit 84 and an inverter (NOT) unit 85. A house load operation switching signal 36 is supplied to the inverter unit 85 through an additional branch line 86, and an inversion signal of the house load operation signal 36 by the inverter unit 85 is supplied to the logical product unit 84. The middle-pressure turbine entrance pressure signal 32 and the generator current signal 33 are converted into percentage value signals by function value units 38 and 39, respectively, and then the percentage value signal corresponding to the generator current signal 33 is subtracted from the percentage value signal corresponding to the middle-pressure turbine entrance pressure signal 32. The subtraction resultant signal is supplied to the monitor unit 83. When the subtraction resultant signal is equal to or higher than a threshold value, the monitor unit 83 outputs a monitor resultant signal to the logical product unit 84. The logical product unit 84 outputs an operation resultant signal 81 to a logical summation (OR) unit 51. Thus, the over-speed protection control (OPC) operation signal 13 is outputted to the load limit control circuit 1.

The turbine output is determined from the middle-pressure turbine entrance pressure 32, and the generator output is determined from the generator current 33. The load unbalanced quantity is the difference between them and a load difference (subtraction value) 43, as mentioned above. The load unbalanced quantity as the load difference 43 is converted to a speed bias by the function value unit 44 and is added to the output value of the function value unit 37 which inputs the rotation frequency 31. If the addition resultant signal 46 is equal to or more than a threshold value of a monitor unit 47, the addition resultant signal is sent as the over-speed protection control signal 13 through the logical summation unit 51.

Moreover, when it is determined by the addition circuit 82 that the load unbalanced quantity 43 is equal to or more than the threshold value of the monitor unit 83 and it is determined by the logical product unit 84 through the inverter unit 85 that there is no house load operation switching signal 36, it is determined that the load loss is large on the system side and a load loss (large) signal 81 is sent. The over-speed protection control signal 13 is sent through the logical summation unit 51.

Moreover, the over-speed protection control signal 13 is outputted when it is determined by the logical product unit 49 that the output value of a function value unit 40 which inputs a generator output 34 is equal to or more than a threshold value of a monitor unit 41 and in case of a generator breaker-on 35 being active. Moreover, the over-speed protection control signal 13 is outputted when a one-shot timer 52 generates a predetermined time period signal.

In the plant in which the run-back signal is generated and set in case of the rapid load change, it is possible to add a signal indicative of non-existence of the run-back signal to the logical product unit 84.

In the conventional over-speed protection control circuit, the over-speed protection control operation on the system isolated operation is dependent on the setting of the function value unit 144 largely and the phenomenon occurs that the over-speed protection control operation signal transmission time delays. However, it is possible to operate the over-speed protection control earlier than the conventional example because the monitor unit 83 provided in the circuit section 82 sends a signal at a very short moment when the load unbalance is larger than a predetermined value. The trip can be avoided by carrying out the over-speed protection control immediately after the switching to the system isolated operation for the load unbalanced quantity more than the set value.

The combined cycle power generation plant of the present invention can carry out a speed control more properly on the occasion of switching to the system operation. Moreover, the speed control can be correctly carried out in accordance with various changes of physical phenomenon.

What is claimed is:

1. A combined cycle power generation plant comprising:
    a gas turbine operating in response to a turbine control signal; and
    a speed control apparatus which outputs said turbine control signal to said gas turbine based on a speed governor control signal for a first time period after an operation of said plant is switched to a system isolated operation, and
    said speed governor control signal is a signal for speed control of said gas turbine, and a switching signal is generated when the operation of said plant is switched to said system isolated operation.

2. The combined cycle power generation plant according to claim 1, wherein said speed control apparatus comprises:
    a speed governor control circuit which generates said speed governor control signal;
    a plurality of limit control circuits which respectively generate control signals for limit controls to said gas turbine; and
    a minimum signal selector which selects said speed governor control signal from among said speed governor control signal and said control signals for said first time period as a signal with lowest level.

3. The combined cycle power generation plant according to claim 2, wherein at least one of said plurality of limit control circuits outputs said control signal in response to said switching signal to have a predetermined level higher than the lowest level for a second predetermined time period including said first time period.

4. The combined cycle power generation plant according to claim 3, wherein said at least one of said plurality of limit control circuits includes a load limit control circuit for maximum output limit control of said gas turbine.

5. The combined cycle power generation plant according to claim 4, wherein said load limit control circuit comprises:
    a one-shot timer which generates a first timer signal for said second predetermined time period in response to said switching signal;
    a constant value generating unit which generates a first constant value signal; and
    a switching unit which outputs said first constant value signal in response to said first timer signal as said control signal.

6. The combined cycle power generation plant according to claim 2, wherein said speed governor control circuit comprises:
    a proportional integrator which proportionally integrates a variable value signal to produce an integration value signal, said variable value signal indicating a difference between a target load value and an actual load value;
    a subtractor which subtracts an actual rotation frequency indicating said actual rotation frequency of said gas turbine from said integration value signal to produce a subtraction resultant signal; and
    an amplifier which amplifies said subtraction resultant signal and outputs the amplified signal as said speed governor control signal.

7. The combined cycle power generation plant according to claim 2, wherein said speed governor control signal is the signal for the speed control of said gas turbine in a rating speed range, and said speed governor control signal is lowered in level in response to said switching signal.

8. The combined cycle power generation plant according to claim 7, wherein said speed governor control circuit comprises:
    a switching unit which outputs a variable value signal as a selected signal usually and outputs a predetermined level signal as said selected signal in response to said switching signal, said variable value signal indicating a difference between a target load value and an actual load value;
    a proportional integrator which proportionally integrates said selected signal to produce an integration value signal;
    a subtractor which subtracts an actual rotation frequency indicating said actual rotation frequency of said gas turbine from said integration value signal to produce a subtraction resultant signal; and
    an amplifier which amplifies said subtraction resultant signal and outputs the amplified signal as said speed governor control signal.

9. The combined cycle power generation plant according to claim 2, wherein said speed control apparatus further comprises:
    an over-speed control circuit which generates an over-speed control operation signal when a difference between a value signal corresponding to an entrance pressure signal of a middle-pressure turbine of said gas turbine and a value signal corresponding to a generator current is equal to or larger than a predetermined threshold, and when the operation of said plant is not switched to a house load operation, and
    a load limit control circuit which comprises:
        a one-shot timer which generate a fourth timer signal for a second predetermined time period in response to said over-speed control operation signal, said second predetermined time period including said first time period;
        a constant value generating unit which generates a fourth constant value signal; and
        a switching unit which outputs said fourth constant value signal in response to said fourth timer signal as said control signal.

10. The combined cycle power generation plant according to claim 9, wherein said at least one of said plurality of limit control circuits outputs said control signal in response to said switching signal to have a predetermined level higher than the lowest level for a second predetermined time period including said first time period and includes a temperature limit control circuit for maximum temperature limit control of said gas turbine.

11. The combined cycle power generation plant according to claim 10, wherein said temperature limit control circuit comprises:
   a one-shot timer which generate a second timer signal for said second predetermined time period in response to said switching signal;
   a constant value generating unit which generates a second constant value signal; and
   a switching unit which outputs said second constant value signal in response to said second timer signal as said control signal.

12. The combined cycle power generation plant according to claim 9, wherein at least one of said plurality of limit control circuits outputs said control signal in response to said switching signal to have a predetermined level higher than the lowest level for a second predetermined time period including said first time period and includes a fuel limit control circuit for maximum fuel limit control of said gas turbine.

13. The combined cycle power generation plant according to claim 12, wherein said temperature limit control circuit comprises:
   a one-shot timer which generate a third timer signal for said second predetermined time period in response to said switching signal;
   a third constant value generating unit which generates a third constant value signal; and
   a switching unit which outputs said third constant value signal in response to said third timer signal as said control signal.

14. A combined cycle power generation plant comprising:
   a gas turbine;
   a load limit control circuit which outputs a load limit control signal to control speed of said gas turbine;
   a speed governor control circuit which outputs a speed governor control signal to control the speed of said gas turbine; and
   a minimum value selector which selects said speed governor control signal from among said load limit control signal and said speed governor control signal for a time period after switching to a system isolated operation of said plant, and
   said speed governor control signal is lower than said load limit control signal in level, and a system isolated operation signal is generated when an operation of said plant is switched to the system isolated operation.

15. The combined cycle power generation plant according to claim 14, wherein said load limit control circuit comprises a first switching unit which outputs said load limit control signal with a level higher than said speed governor control signal in response to said system isolated operation signal.

16. The combined cycle power generation plant according to claim 14, wherein said speed governor control signal is a signal with a level corresponding to a subtraction value obtained by subtracting a rotation frequency of said gas turbine from an integration value of a variable value signal with respect to a reference level, said variable value signal indicating a difference between a load set value and an actual load value, and
   said speed governor control circuit comprises a second switching unit which outputs a value with a level lower than said variable value signal in response to said system isolated operation signal in place of said variable value signal.

17. The combined cycle power generation plant according to claim 14, wherein said load limit control circuit comprises a first switching unit which outputs said load limit control signal with a level higher than said speed governor control signal in response to said system isolated operation signal,
   wherein said speed governor control signal is a signal with a level corresponding to a subtraction value obtained by subtracting a rotation frequency of said gas turbine from an integration value of a variable value signal with respect to a reference level, said variable value signal indicating a difference between a load set value and an actual load value, and
   said speed governor control circuit comprises a second switching unit which outputs a value with a level lower than said variable value signal in response to said system isolated operation signal in place of said variable value signal.

18. The combined cycle power generation plant according to claim 14, further comprising:
   a temperature limit control circuit comprises a third switching unit which outputs a temperature limit control signal with a level higher than said speed governor control signal in response to said system isolated operation signal for said predetermined time period.

19. The combined cycle power generation plant according to claim 14, further comprising:
   a fuel limit control circuit comprises a fourth switching unit which outputs a fuel limit control signal with a level higher than said speed governor control signal in response to said system isolated operation signal for said predetermined time period.

20. The combined cycle power generation plant according to claim 14, further comprising:
   an over-speed control logic circuit which outputs a load loss signal as a logical product of a load difference signal and a logical inversion of said system isolated operation signal.

* * * * *